No. 668,301. Patented Feb. 19, 1901.
A. W. WELLS & J. W. MULLEN.
MACHINE FOR PARAFFINING PAPER BOARD AND CUTTING SAME INTO SHEETS OR SECTIONS.
(Application filed Feb. 14, 1898.)
(No Model.) 4 Sheets—Sheet 1.

Witnesses:
Chas. E. Gaylord,
John Enders, Jr.

Inventors:
Abel W. Wells, and
John W. Mullen,
By Banning & Banning & Sheridan
Att'ys.

No. 668,301. Patented Feb. 19, 1901.
A. W. WELLS & J. W. MULLEN.
MACHINE FOR PARAFFINING PAPER BOARD AND CUTTING SAME INTO SHEETS OR SECTIONS.
(Application filed Feb. 14, 1898.)

(No Model.) 4 Sheets—Sheet 3.

Witnesses:
Inventors:
Abel W. Wells
John W. Mullen

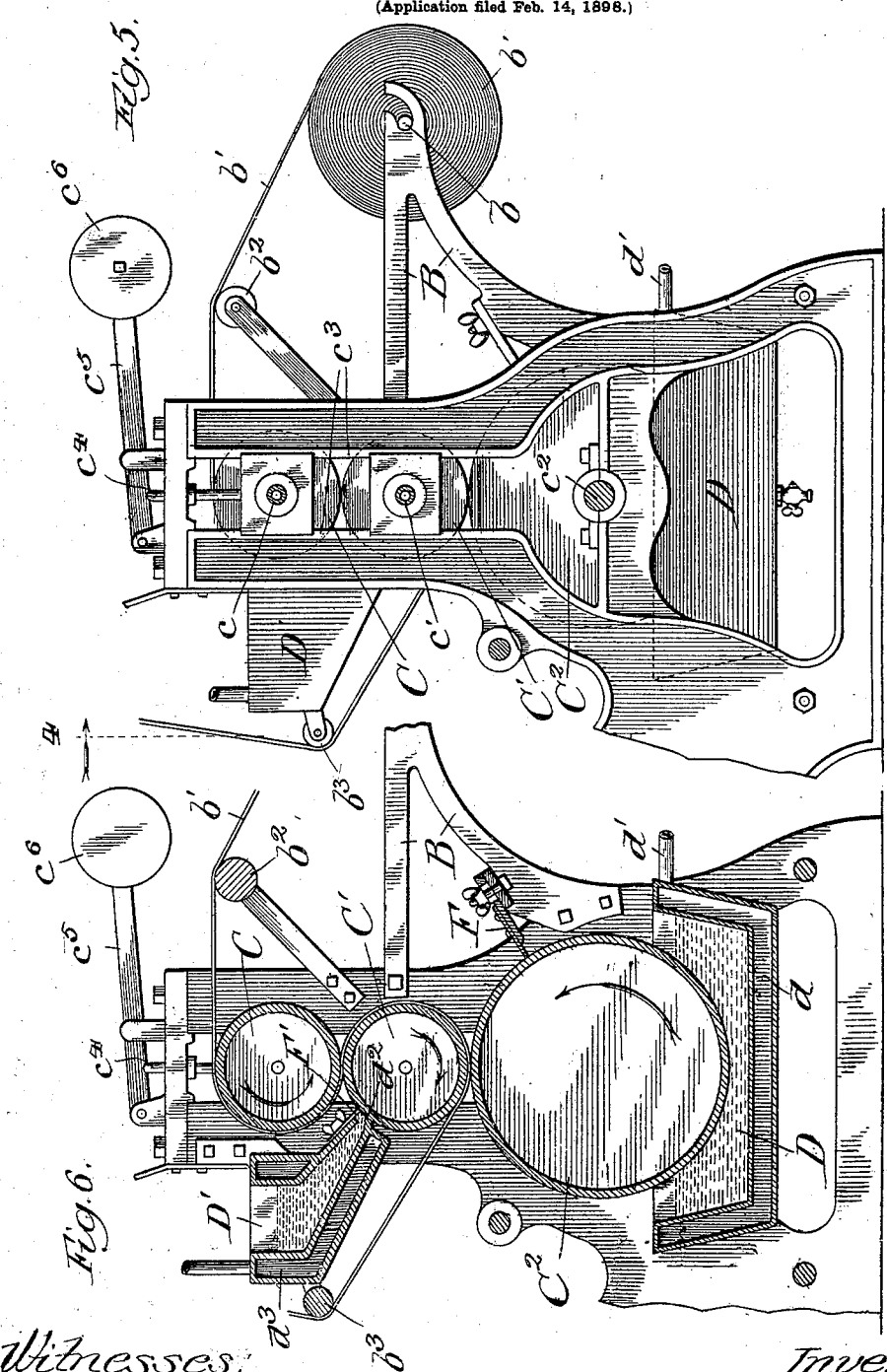

UNITED STATES PATENT OFFICE.

ABEL W. WELLS AND JOHN W. MULLEN, OF ST. JOSEPH, MICHIGAN.

MACHINE FOR PARAFFINING PAPER-BOARD AND CUTTING SAME INTO SHEETS OR SECTIONS.

SPECIFICATION forming part of Letters Patent No. 668,301, dated February 19, 1901.

Application filed February 14, 1898. Serial No. 670,214. (No model.)

*To all whom it may concern:*

Be it known that we, ABEL W. WELLS and JOHN W. MULLEN, citizens of the United States, residing at St. Joseph, in the county of Berrien and State of Michigan, have invented certain new and useful Improvements in Machines for Paraffining Paper-Board and Cutting the Same into Sheets or Sections, of which the following is a specification.

Our invention relates to machines for taking paper-board from a roll and coating one or both sides of it with paraffin, and then cutting it into sheets or sections of any desired size and shape for use, storage, and shipment.

The object of our invention is to provide a simple, economical, and efficient machine for coating continuous strips of paper-board on one or both sides with paraffin and cutting the same into sheets or sections of desired sizes and shapes for use, storage, and shipment; and the invention consists in the features, combinations, and details of construction hereinafter described and claimed.

Figure 1:
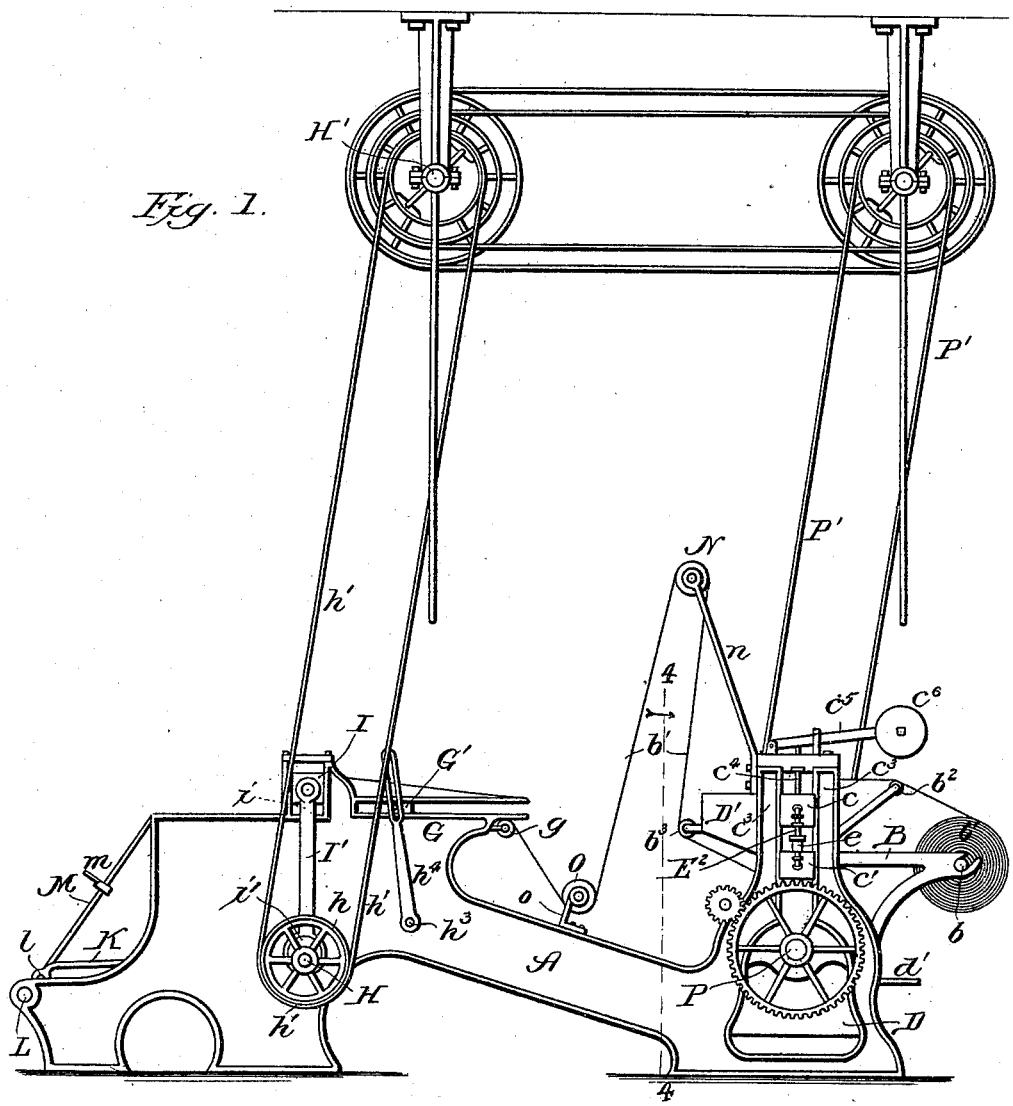
Figure 2:
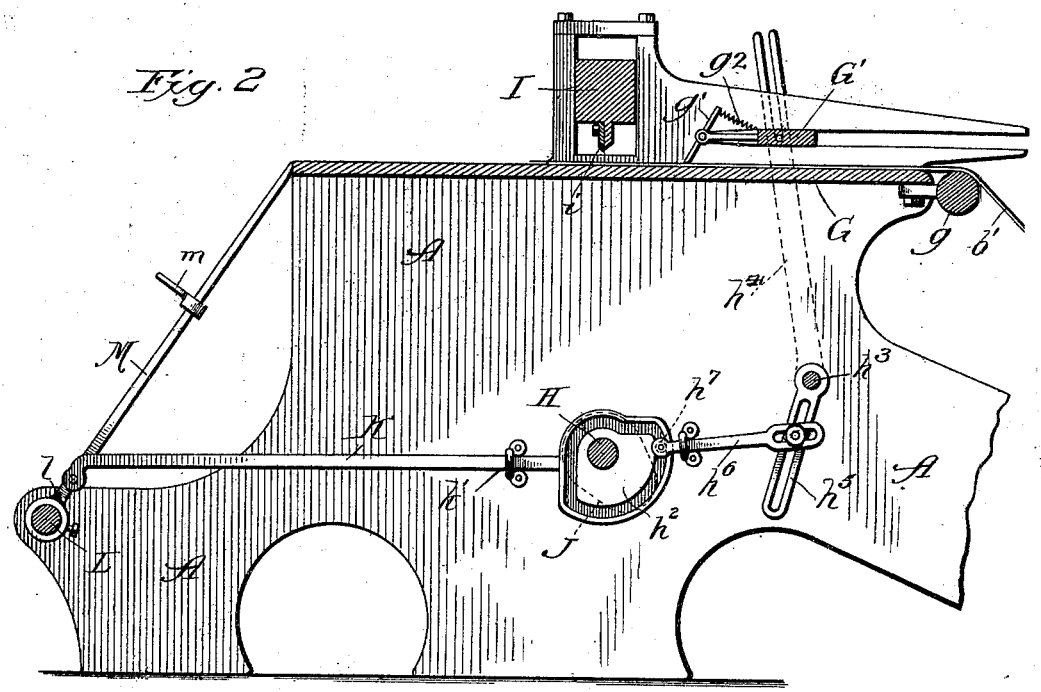
Figure 3:
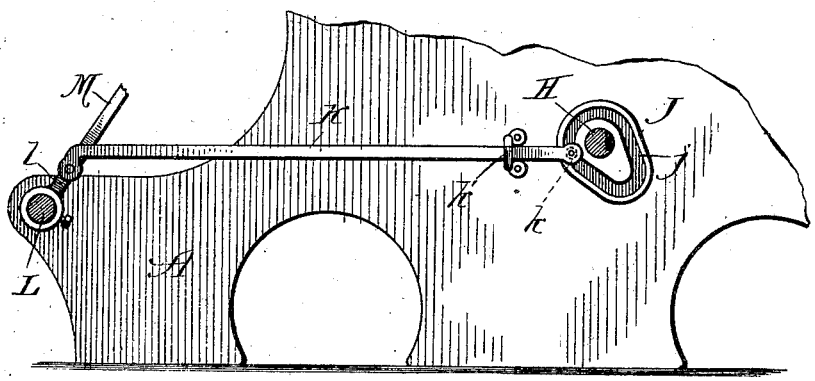
Figure 4:
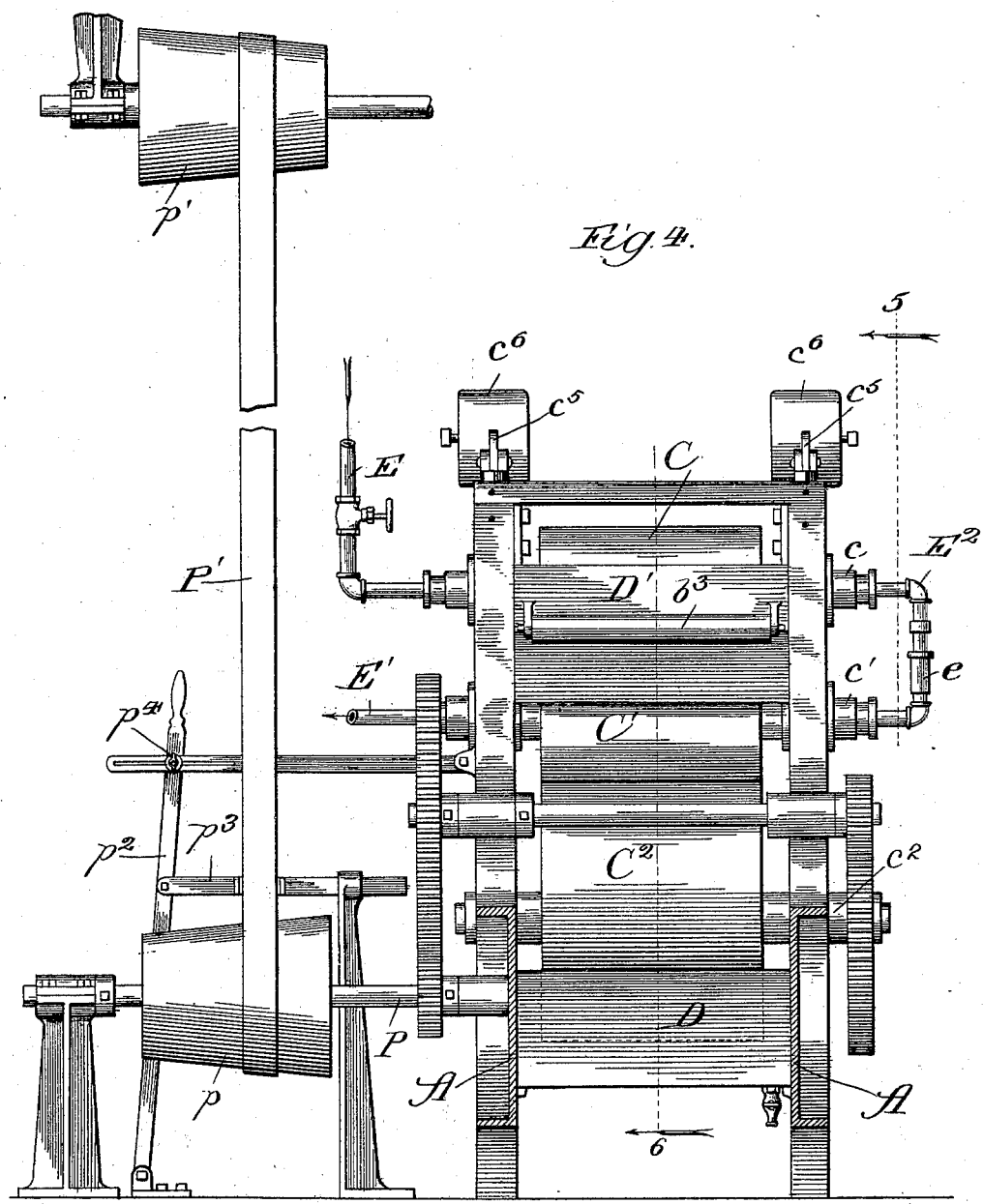

In the accompanying drawings, Figure 1 is a side elevation of the paraffining apparatus and the feeding and cutting mechanism of our invention, with an arrangement of driving pulleys and belts for operating the same; Fig. 2, a longitudinal sectional elevation of the feeding, cutting, and delivering mechanism, taken at or near the longitudinal center of the machine; Fig. 3, a sectional elevation of the parts represented, showing the delivery apron or fly and the operating devices therefor; Fig. 4, a sectional elevation taken on line 4 of Fig. 1; Fig. 5, a side elevation of a portion of the machine, taken on line 5 of Fig. 4 looking in the direction of the arrow; Fig. 6, a longitudinal sectional elevation taken on line 6 of Fig. 4 looking in the direction of the arrow.

In constructing a machine in accordance with our improvements we make a frame A of the desired size, shape, and strength to sustain and hold the different working parts in operative position, and for purposes of economy and illustration and description we prefer to show the different portions of the frame as made in one integral piece, though it may be made in several parts and bolted or otherwise secured together for convenience in building or operation to meet the requirements or necessities of the art. At one end of the frame we provide arms or brackets B and suitably mount thereon a spindle $b$, adapted to hold a roll of paper-board $b'$ in position to be fed into the machine for the purpose of coating one or both sides of it with paraffin.

In order to paraffin one or both sides of the paper-board previous to the forming or cutting of it into desired articles, we preferably provide the frame of the machine with three rolls C, C', and $C^2$, arranged in the same vertical plane and rotatably mount them in boxes $c$, $c'$, and $c^2$, secured to or in the frame portion. The upper or primary and secondary rolls C and C' have their boxes $c$ and $c'$ slidingly mounted in guides $c^3$ in the frame portion, so that they may be raised and lowered, as desired, or acted upon by means of the stud $c^4$, lever and weight $c^5$ and $c^6$, all of which tend to keep a certain amount of pressure or friction force on the paper-board as it passes between the rolls. The lower roll is what might be properly termed the "paraffining-roll" and is arranged so that it rotates in a pan D, arranged directly underneath the same, such pan being adapted to hold a quantity of paraffin, and as the pan has a steam or heating chamber $d$, provided with a steam-supply pipe $d'$, the paraffin may be kept in a liquid condition of a desired consistency. A second pan or receptacle D' for holding liquid paraffin is provided with a spout $d^2$, arranged to supply the periphery of the secondary roll for the purpose of coating the opposite side of the paper-board $b'$, passing between the rolls. This second pan is also provided with a steam-jacket $d^3$ for the purpose of keeping the paraffin in the desired liquid condition.

It will be noticed that the paper-board as it is fed from the roll passes over an idler $b^2$ before it contacts the upper surface of the primary roll and is then passed around the upper part of the primary and between the primary and secondary rolls, and then partly around the secondary roll and between it and the paraffining-roll, from which it is drawn out and around a second idler-pulley $b^3$ before it is operated on by the cutting or forming tools, which will be hereinafter described.

It is necessary in order to prepare the paper for paraffining that it should be slightly heated, and in order to accomplish this result we prefer to make the first and second rolls hollow and provide one of them with a steam-inlet pipe E and the other with a steam-outlet pipe E', connected together on the opposite side by means of the pipe E², which has an expansion-joint e to permit the lateral movements of the rolls. By this means steam may be fed to the rolls and they may be kept at the desired temperature in order to heat the paper passing between the same. If no means were provided for regulating the quantity of paraffin supplied to the paper-board, the rolls would feed it irregularly. In order, however, to prevent this, we prefer to provide scrapers F and F', arranged lengthwise of the rolls and in such manner that they may be adjustable to or from the surface of the rolls, so as to scrape off the surplus paraffin and only permit a desired amount to be conveyed to and impressed into the paper in a uniform manner.

In this art it is well known that after the paper has been paraffined if it should be again formed into rolls the contiguous layers will adhere to each other, so that in unrolling the paper-board it would pull off the paraffin and be apt to destroy the surface of the paper. We have therefore designed our machine to overcome this difficulty by combining with the apparatus which paraffins the paper-board in continuous strips a mechanism and arrangement by which the strips will be fed intermittently to a cutting mechanism by which the strips are cut into sheets or sections of desired sizes and shapes.

In order to feed the paper into position for the cutting operation, we provide the frame of the machine with a table G, arranged to receive the strip of paper-board from an idler-roll g. Arranged adjacent to the upper side of this table is a feeding sliding block G', provided with a vibrating or pivotally-mounted finger g', one end of which is arranged to grasp the paper-board between it and the table, and the other end of which is provided with a helically-coiled spring g², arranged to keep sufficient tension on the finger, so that when the feeding-block moves forward it will pinch the paper-board and carry it forward with it and when the sliding block is retracted the spring will yield to allow the finger to slip over the paper to prevent it from carrying the paper-board backwardly. In order to operate this sliding block, an operating-shaft H is provided and arranged to be driven by means of a pulley $h$, which is connected with an overhead counter-shaft H' by means of the belt $h'$. This shaft is provided with a cam $h^2$, and mounted adjacent thereto is a rock-shaft $h^3$, carrying levers $h^4$ and $h^5$, the lever $h^4$ engaging directly with the sliding block, while the lever $h^5$ is connected with the cam by means of the link $h^6$, which has a roll $h^7$ on one end thereof traveling in the groove in the cam. It will therefore be seen that as the cam rotates a vibrating motion is given to the operating-levers $h^4$ and $h^5$, which causes a reciprocation of the feeding sliding block to push or carry the paper-board into position to be operated on.

In order to operate on the paper or paper-board and cut the continuous strips after being paraffined into flat sheets or sections of a desired size and shape, we provide the frame of the machine with a cross-head I, reciprocatingly mounted in vertical guides in the frame and provided with a cutter or knife $i$, which as the cross-head is moved downwardly contacts the continuous strip of paper or paper-board on the table and cuts it into sheets or sections of any desired sizes and shapes. This cutting cross-head is operated by means of the pitman I', which encircles a suitable eccentric $i'$ on the operating-shaft H, (shown particularly in Fig. 1,) so that as the operating-shaft rotates the cross-head is moved up and down. After the continuous strip of paper or paper-board has been cut into sheets or sections of the size and shape required it is desirable to deliver the cut sheets or sections in proper shape for further disposition, which disposition may be for direct use or for storage or to be packed for shipment, and in order to accomplish this result we provide a vibrating delivery apron or fly M, having thereon an adjustable support $m$ and arranged for its upper or free end to come about to a level of the table G, so that as the continuous strip of paper or paper-board is advanced or fed forward by the feed it pushes the cut sheet or section from the table onto the apron or fly for its lower edge to rest on the support $m$ and have the downward movement of the apron or fly carry the cut sheet or section and deliver the same to a table or a truck or other place of deposit, as may be desired. In order to vibrate this apron or fly, we mount it on a rock-shaft L, which is operated by means of a pitman or rod K, attached at one end to an arm or crank $l$ on the shaft, passing through a guide $k'$ and having its other end provided with a roller $k$, which enters a cam-groove $j$ in a cam or disk J on the shaft H, so that with the revolving of the shaft the cam J will, through the connecting-rod or pitman K, rock the shaft L and raise and lower the apron or fly for the apron or fly when raised to receive a sheet or section from the table and deposit such sheet or section with the downward movement of the apron or fly.

It will be readily understood from the foregoing description and an inspection of the drawings that the paraffining of the paper is continuous, while the feeding of the paper into position for cutting and the cutting operation are intermittent, there being periods of rest and periods of movement. Consequently the feeding and cutting will be irregular, while the paraffining of the paper-board will be regular. In order, therefore, to provide for this and allow a certain amount of slack in the strip of paper, we pass the paper-board after it leaves the paraffining mechanism over an upper idler N, mounted in arms $n$, attached, as shown, to the support or frame of the paraffining-rollers, and a lower idler O, mounted in supports o, attached, as shown, to the main frame of the machine and particularly shown in Fig. 1. The driving-shaft P is provided with a cone-pulley p and the overhead counter-shaft with a corresponding cone-pulley p', arranged in a reverse manner to the lower one, so that the driving-belt P' may be moved by means of the shifter and rod p² and p³ and held in any desired position to give the paraffining mechanism the desired speed. A lock p⁴ may be used to hold the belt-shifting mechanism in desired position, as shown in Fig. 4.

We claim—

1. In a machine of the class described, the combination of a primary roll, an intermediate roll, around and between which two rolls and in direct contact with both rolls at the meeting-line a sheet or strip of paper is passed to be waxed, and a wax-applying roll between which and the intermediate roll and in direct contact with both rolls at the meeting-line the sheet or strip of paper passes for receiving its coat of wax, substantially as described.

2. In a machine of the class described, the combination of a primary roll, an intermediate roll, around and between which two rolls and in direct contact with both rolls at the meeting-line a sheet or strip of paper is passed to be waxed, a wax-applying roll between which and the intermediate roll and in direct contact with both rolls at the meeting-line the sheet or strip of paper passes for receiving its coating of wax, and a sheet-receiving mechanism and a cutting mechanism operating on the sheet or strip after it leaves the waxing-roll, substantially as described.

3. In a machine of the class described, the combination of three rolls arranged in a vertical plane one over the other, around and between which three rolls and in direct contact with all of them at the meeting-line of the respective rolls a sheet or strip of paper passes for receiving a coating of wax, adjustable journal-boxes for the primary or upper roll and the intermediate roll, and a slack-supporting means over which the waxed paper runs to have a greater length on the sides farthest away from the waxing-rolls to maintain the paper taut at the point of leaving the waxing-rolls, substantially as described.

4. In a machine of the class described, the combination of a primary roll, an intermediate roll, around and between which two rolls and in direct contact with both rolls at the meeting-line a sheet or strip of paper is passed to be waxed, a steam-pipe passing through the primary roll and returning through the intermediate roll for heating the rolls, a wax-applying roll between which and the intermediate roll and in direct contact with both rolls at the meeting-line a sheet or strip of paper passes for receiving its coating of wax, a receptacle for liquid paraffin, an adjustable scraper for the waxing-roll, a slack-supporting means over which the waxed paper runs to have a greater length on the side farthest away from the waxing-roll to maintain the paper taut at the point of leaving the waxing-rolls, substantially as described.

5. In a machine of the class described, the combination of three rolls, the lower and the intermediate rolls operating to apply wax to a sheet or strip of paper passing around and between the upper and intermediate rolls and in direct contact with both rolls at the meeting-line and around and between the intermediate roll and the lower roll and in direct contact with both rolls at the meeting-line, means for applying wax to the lower and intermediate rolls, a scraper for each of said rolls adjustable in relation to the rolls, slack-supporting means on the delivery side of the rolls operating to maintain the paper taut at the point of leaving the waxing-rolls, and a cutting mechanism operating on the sheet after it leaves the waxing-rolls and forward of the slack-supporting means, substantially as described.

ABEL W. WELLS.
JOHN W. MULLEN.

Witnesses:
CHAS. W. STRATTON,
LAWRENCE C. FYFE.